United States Patent
Preisler et al.

(10) Patent No.: US 6,475,937 B1
(45) Date of Patent: Nov. 5, 2002

(54) LIGHTWEIGHT, THERMOPLASTIC, VEHICLE HEADLINER HAVING AT LEAST ONE INTEGRALLY-FORMED, ENERGY-ABSORBING, HEAD-IMPACT MECHANISM AND INJECTION MOLDING METHOD FOR MAKING SAME

(75) Inventors: Darius J. Preisler, Macomb, MI (US); Larry J. Winget, Leonard, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/527,755

(22) Filed: Mar. 17, 2000

(51) Int. Cl.⁷ ................................................ B32B 5/24
(52) U.S. Cl. ...................... 442/370; 442/381; 442/394; 428/308.4; 428/314.4; 296/189; 296/211; 296/214; 280/751
(58) Field of Search ................................. 442/370, 381, 442/394; 296/211, 214, 189; 428/308.4, 314.4; 280/751

(56) References Cited

U.S. PATENT DOCUMENTS

| | | | |
|---|---|---|---|
| 3,444,034 A | | 5/1969 | Hewett |
| 3,776,591 A | * | 12/1973 | Krueger ...................... 296/146 |
| 3,853,349 A | | 12/1974 | Moore |
| 3,953,067 A | * | 4/1976 | Isola ........................... 296/137 |
| 4,119,749 A | | 10/1978 | Roth et al. |
| 4,131,702 A | | 12/1978 | Alfter et al. |
| 4,172,918 A | | 10/1979 | Doerer |
| 4,413,856 A | | 11/1983 | McMahan et al. |
| 4,478,660 A | | 10/1984 | Landler et al. |
| 4,600,621 A | | 7/1986 | Maurer et al. |
| 4,995,659 A | | 2/1991 | Park |
| 5,007,976 A | | 4/1991 | Satterfield et al. |
| 5,082,716 A | | 1/1992 | Satterfield et al. |
| 5,089,328 A | | 2/1992 | Doerer et al. |
| 5,306,068 A | | 4/1994 | Nakae et al. |
| 5,415,554 A | * | 5/1995 | Kempkers et al. ............ 439/34 |
| 5,429,412 A | | 7/1995 | Schoen et al. |
| 5,482,669 A | | 1/1996 | Shah |
| 5,574,087 A | | 11/1996 | Kobayashi et al. |
| 5,575,500 A | | 11/1996 | Mimura et al. |
| 5,622,402 A | | 4/1997 | Pritchard et al. |
| 5,660,908 A | | 8/1997 | Kelman et al. |
| 5,900,199 A | | 5/1999 | Dickson et al. |

FOREIGN PATENT DOCUMENTS

| | | |
|---|---|---|
| DE | 1895 020 U1 | 6/1964 |
| DE | 2349830 C2 | 4/1973 |
| DE | 198 49 942 A1 | 10/1998 |

* cited by examiner

Primary Examiner—Terrel Morris
Assistant Examiner—Hai Vo
(74) Attorney, Agent, or Firm—Brooks & Kushman P.C.

(57) ABSTRACT

Lightweight, thermoplastic, vehicle headliners each having at least one integrally-formed, energy-absorbing, head-impact mechanism and injection molding methods for making same are provided. Each headliner includes a stiff, self-supporting, thermoplastic sheet adapted to be mounted adjacent a roof of the vehicle so as to underlie the roof and shield the roof from view. The sheet has an upper surface and a lower surface. Each energy-absorbing, head-impact mechanism absorbs energy of an impact with its associated headliner by a passenger of the vehicle. In one embodiment, the at least one head-impact mechanism includes a plurality of spaced-apart, energy-absorbing, thermoplastic structures, such as ribs, which are connected to and extend upwardly from the upper surface of its thermoplastic sheet. In another embodiment, the at least one head-impact mechanism includes a fabric or other material having a foam backing bonded to the lower surface of the thermoplastic sheet to create a cosmetically-acceptable appearance for the headliner and which is compressed by a passenger of the vehicle to absorb energy of the impact. In yet another embodiment, the at least one head-impact mechanism includes a series of tubular voids formed in the thermoplastic sheet and which are compressible for absorbing energy of the impact. Each headliner also preferably includes at least one attachment mechanism such as a hollow, plastic grab handle integrally formed with its thermoplastic sheet.

17 Claims, 5 Drawing Sheets

LIGHTWEIGHT, THERMOPLASTIC, VEHICLE HEADLINER HAVING AT LEAST ONE INTEGRALLY-FORMED, ENERGY-ABSORBING, HEAD-IMPACT MECHANISM AND INJECTION MOLDING METHOD FOR MAKING SAME

TECHNICAL FIELD

This invention relates to lightweight, thermoplastic, vehicle headliners having at least one integrally-formed, energy-absorbing, head-impact mechanism and injection molding methods for making same.

BACKGROUND ART

Modern-day vehicle headliners must meet a number of requirements. Not only must headliners by lightweight and cost competitive with alternative headliners, but they must be recyclable, have good acoustic properties and meet head-impact requirements.

U.S. Pat. No. 4,119,749 discloses a headliner formed from foam panels shaped in a mold and is impregnated within the elastomer.

U.S. Pat. No. 4,131,702 discloses molding of laminated foam panels by heat for producing a headliner.

U.S. Pat. No. 4,172,918 discloses foamed plastic in a decorative cover that is heated and bonded.

U.S. Pat. No. 4,478,660 discloses a decorative cover and a carrier that are connected by a foam with heat and pressure in a mold.

U.S. Pat. No. 4,600,621 discloses a foam that is covered with a decorative fabric.

U.S. Pat. Nos. 5,007,976 and 5,082,716 disclose methods of making headliners in a mold using decorative fabric and a foam joined by an adhesive.

U.S. Pat. No. 5,089,328 discloses a method of making a panel having a foam-backed cover including layers that are bonded together by heat in a mold.

U.S. Pat. No. 5,660,908 discloses a vehicle headliner including reverse ribs for support.

U.S. Pat. No. 5,622,402 discloses an interior structural panel for a vehicle including a thermoplastic air duct.

U.S. Pat. No. 5,575,500 discloses a structural upper body member for a vehicle including a vertical element having an outer and an inner member forming a cavity therebetween.

U.S. Pat. No. 5,306,068 discloses a door including a plurality of integral foam resin tubes.

U.S. Pat. No. 4,413,856 discloses a rigid bumper mounted to a vehicle by cellular spring brackets.

U.S. Pat. No. 3,444,034 discloses a synthetic structural panel having integral interconnected portions.

U.S. Pat. No. 5,482,669 discloses a method and apparatus for creating gas-assisted injection molded structures.

U.S. Pat. No. 5,574,087 discloses a molded-resin, protective strip for vehicles.

U.S. Pat. No. 5,900,199 discloses a grille guard comprising a plastic-molded, pipe-like structure.

U.S. Pat. No. 4,995,659 discloses apparatus including tubular air sheets that cover the majority of a vehicle for reducing shock.

U.S. Pat. No. 3,853,349 discloses a vehicle body including a large number of cylindrical cavities.

U.S. Pat. No. 5,429,412 discloses a plastic fascia for attachment to a fender panel.

SUMMARY OF THE INVENTION

An object of the present invention is to provide a lightweight, thermoplastic, vehicle headliner having at least one integrally-formed, energy-absorbing, head-impact mechanism and an injection molding method for making same wherein the headliner is relatively inexpensive and light, is recyclable, has good acoustic properties and meets head-impact requirements.

Another object of the present invention is to provide a lightweight, thermoplastic, vehicle headliner having at least one integrally-formed, energy-absorbing, head-impact mechanism and an injection molding method for making same wherein the headliner is dimensionally stable, will hold its shape while spanning a passenger compartment, and is capable of meeting close tolerances, even when exposed to high humidity and elevated temperatures such as experienced by vehicles in tropical and hot desert climates.

Yet another object of the present invention is to provide a lightweight, thermoplastic, vehicle headliner having at least one integrally-formed, energy-absorbing, head-impact mechanism and an injection molding method for making same wherein the headliner is readily handled either manually or by automated equipment and inserted and held while being fastened to the interior of the occupant compartment of the vehicle.

Yet still another object of the present invention is to provide a lightweight, thermoplastic, vehicle headliner having at least one integrally-formed, energy-absorbing, head-impact mechanism and an injection molding method for making same wherein the headliner can be manufactured within a single injection mold.

In carrying out the above objects and other objects of the present invention, a lightweight, thermoplastic headliner for use in a vehicle having a roof is provided. The headliner includes a stiff, self-supporting, thermoplastic sheet adapted to be mounted adjacent the roof so as to underlie the roof and shield the roof from view. The sheet has an upper surface and a lower surface. The headliner also includes at least one energy-absorbing, head-impact mechanism formed on the sheet for absorbing energy of an impact with the headliner by a passenger of the vehicle.

In one embodiment, the at least one head-impact mechanism includes a plurality of spaced-apart, energy-absorbing, thermoplastic structures which are connected to and extend upwardly from the upper surface of the thermoplastic sheet. The thermoplastic structures may be ribs which are permanently deformable by the roof for absorbing energy of the impact.

The at least one head-impact mechanism may include a fabric or other material having a foam backing bonded to the lower surface of the thermoplastic sheet to create a cosmetically-acceptable appearance for the headliner. The fabric and its foam backing are compressed by a passenger of the vehicle to absorb energy of the impact.

In another embodiment, the at least one head-impact mechanism includes a series of tubular voids formed in the thermoplastic sheet. The voids are compressible for absorbing energy of the impact.

Preferably, the headliner further includes at least one attachment mechanism integrally formed with the thermoplastic sheet. The at least one attachment mechanism may be a hollow, plastic, grab handle.

The at least one attachment mechanism may provide an attachment location for securing a sun visor, a mirror, an overhead console, a coat hanger, or a lamp to the headliner.

The thermoplastic of the sheet may be thermoplastic polyolefin (TPO) or polypropylene or ABS.

The at least one attachment mechanism may include a plurality of spaced, apertured structures for receiving and retaining electrical wires therein.

The at least one attachment mechanism may include a pair of apertured window frames adapted to be received and retained within corresponding openings in the roof of the vehicle.

Further in carrying out the above objects and other objects of the present invention, an injection molding method for making a lightweight, thermoplastic, vehicle headliner having at least one integrally-formed, energy-absorbing, head-impact mechanism is provided. The method includes providing an injection mold having first and second mold halves, closing the mold so that the first and second mold halves define a mold cavity, and injecting molten, thermoplastic resin into the mold cavity to form a headliner including a stiff, self-supporting, thermoplastic sheet and a plurality of spaced-apart, energy-absorbing structures. The method further includes cooling the headliner beneath the softening point of the molten resin and opening the mold and removing the headliner. The energy-absorbing structures may be ribs.

Still further in carrying out the above objects and other objects of the present invention, a second injection molding method for making a lightweight, thermoplastic, vehicle headliner having at least one integrally-formed, energy-absorbing, head-impact mechanism is provided. The method includes providing an injection mold having first and second mold halves, closing the mold so that first and second mold halves define a mold cavity, and injecting molten, thermoplastic resin into the mold cavity. The method further includes communicating a charge of pressurized fluid into the mold cavity to distribute the molten resin over the interior surfaces of the mold and to form a series of tubular voids in the molten resin. The method still further includes containing the fluid under pressure until a headliner including a stiff, self-supporting, thermoplastic sheet and a series of tubular voids formed therein have set up. Finally, the method includes cooling the headliner beneath the softening point of the molten resin, and opening the mold and removing the headliner.

Yet still further in carrying out the above objects and other objects of the present invention, a third injection molding method for making a lightweight, thermoplastic, vehicle headliner having at least one integrally-formed, energy-absorbing, head-impact mechanism is provided. The method includes providing an injection mold having first and second mold halves, placing a fabric or other material having a foam backing between the first and second mold halves, and closing the mold so that the first and second mold halves define a mold cavity with the fabric or other material in the mold cavity. The method also includes injecting molten, thermoplastic resin into the mold cavity to generate a stiff, self-supporting, thermoplastic sheet. The generation of the sheet creates sufficient pressure and heat to bond the sheet to the foam to form a headliner. The method further includes cooling the headliner beneath the softening point of the molten resin, and opening the mold and removing the headliner.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figures 1, 2A, 2B:
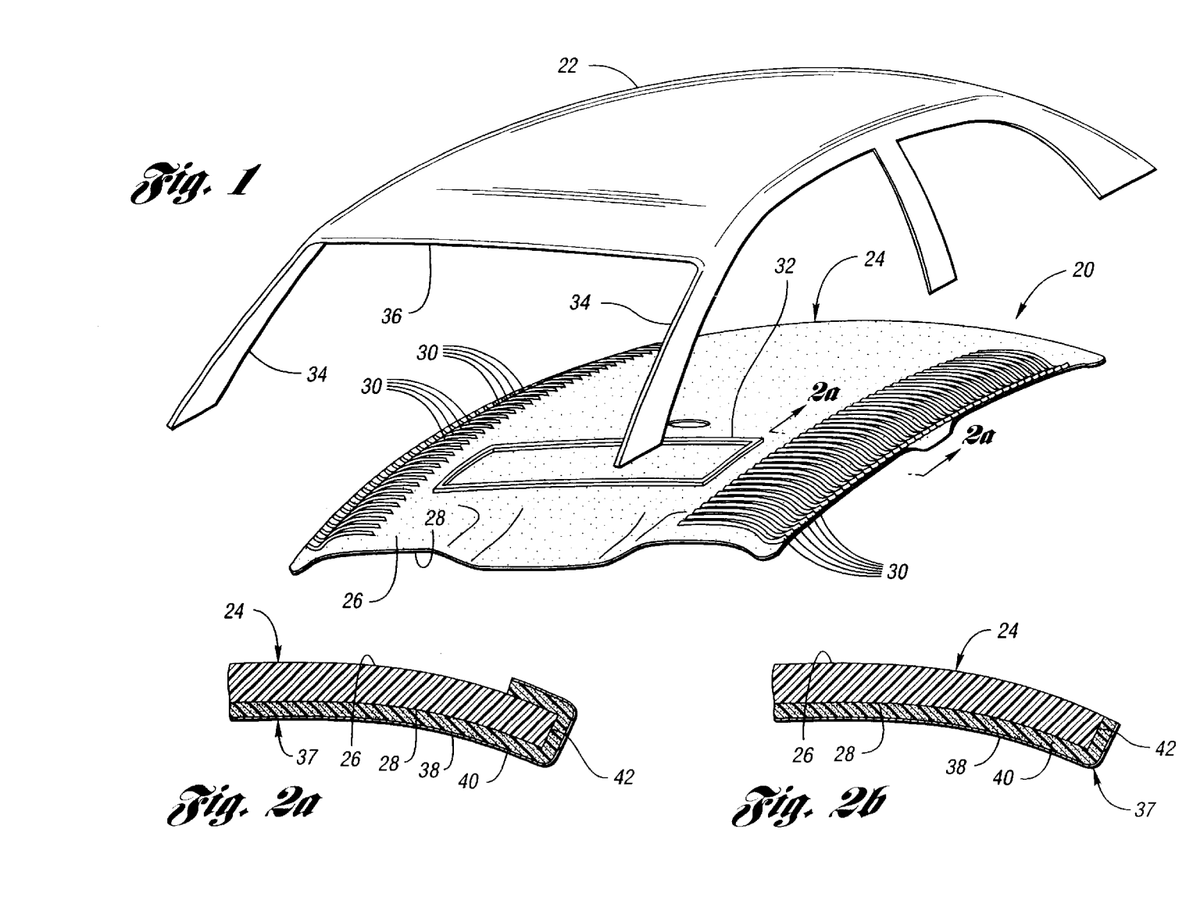
FIG. 1 is a perspective view of a lightweight, thermoplastic headliner constructed in accordance with one embodiment of the present invention adjacent a motor vehicle roof to which it is to be secured.
FIG. 2a is a view, partially broken away and in cross-section, of the headliner taken along lines 2a—2a of FIG. 1 but without the headliner's integrally-formed ribs but with a different energy-absorbing, head-impact mechanism.
FIG. 2b is a view similar to the view of FIG. 2a except the head-impact mechanism in the form of a cloth- or vinyl-backed foam pad only extends over bottom and sides surfaces of the thermoplastic sheet of the headliner and not the top surface of the sheet.

Referring now to the drawing Figures, there is illustrated in FIG. 1 a first embodiment of a lightweight, thermoplastic headliner, generally indicated at 20, constructed in accordance with the present invention. The headliner 20 is adapted for use in a motor vehicle including a roof 22. The headliner 20 includes a stiff, self-supporting, thermoplastic sheet, generally indicated at 24, which is adapted to be mounted adjacent the roof 22 so as to underlie the roof 22 and shield the roof 22 from view. The sheet 24 has an upper surface 26 and a lower surface 28.

The headliner 20 also includes a pair of spaced, energy-absorbing, head-impact mechanisms. Each of the mechanisms includes a plurality of spaced-apart, energy-absorbing, thermoplastic ribs 30 formed on the upper surface of the thermoplastic sheet 24 for absorbing energy of an impact with the headliner 20 by a passenger of the vehicle. The ribs 30 are connected to and extend upwardly from the upper surface 26 of the thermoplastic sheet 24. The thermoplastic ribs 30 typically are permanently deformable by the roof 22 for absorbing energy of the impact. The number, spacing and size of the ribs 30 are typically determined in order to satisfy various head impact requirements such as 800 HIC requirements.

Also integrally formed on the upper surface 26 of the thermoplastic sheet 24 is a hollow frame structure 32 which may be formed by a gas-assist injection molding process, as is described in greater hereinbelow, to provide a raised surface by which the headliner 20 may be attached to the vehicle roof 22. For example, the headliner 20 may be attached to the vehicle roof 22 at the frame structure 32 by double-sided tape or a heat-activated adhesive may be applied to a top surface of the frame structure 32. Alternatively, the upper surface 26 of the thermoplastic sheet 24 may be provided with integrally formed fasteners (not shown) to fasten the headliner 20 to complementarily-formed fasteners (not shown) formed on the lower surface of the vehicle roof 22.

The thermoplastic resin of the thermoplastic sheet 24 may be TPO, ABS, or polypropylene so that the thermoplastic sheet 24 is stiff and self-supporting, yet is flexible enough to bend slightly so that the headliner 20 can be inserted between two spaced apart pillars 34 of the vehicle roof 22 which help to define a front windshield opening 36 of the vehicle roof 22.

Referring now to FIGS. 2a and 2b, there are illustrated two embodiments of a different energy-absorbing, head-impact mechanism of the headliner 20 in the form of a foam-backed material, generally indicated at 37, which includes a cloth or vinyl fabric Class A surface layer 38 bonded to an open or closed cell foam pad 40 which, in turn, is bonded to the lower surface 28 of the thermoplastic sheet 24. In the embodiment of FIG. 2a, the foam-backed material 37 covers not only on the lower surface 28 of the thermoplastic sheet 24, but also side and upper surfaces 42 and 26, respectively, of the thermoplastic sheet 24.

In the embodiment of FIG. 2b, the foam-backed material 37 only covers the lower and side surfaces 28 and 42, respectively, of the thermoplastic sheet 24. The cloth surface layer 38 may be a nylon-wound propylene. The layer 38 creates a cosmetically-acceptable appearance for the headliner 20 and the pad 40 is compressed by a passenger of the vehicle to absorb energy of the impact.

The foam-backed material 37 may be initially pre-processed, such as in a vacuum mold, to form the foam-backed material 37 to a desired shape prior to bonding to the thermoplastic sheet 24 such as through an insert molding process or by adhesively bonding the foam layer 40 of the material 37 to the thermoplastic sheet 24.

Alternatively, instead of providing the lower surface 28 of the thermoplastic sheet 24 with the foam-backed material 37, the lower surface 28 of the thermoplastic sheet 24 may be painted with a soft-touch paint.

Preferably, the thickness of the thermoplastic sheet is in the range of 2–4 millimeters whereas the thickness of the foam-backed material is in the range of 0.5–3 millimeters thick.

Figure 3:
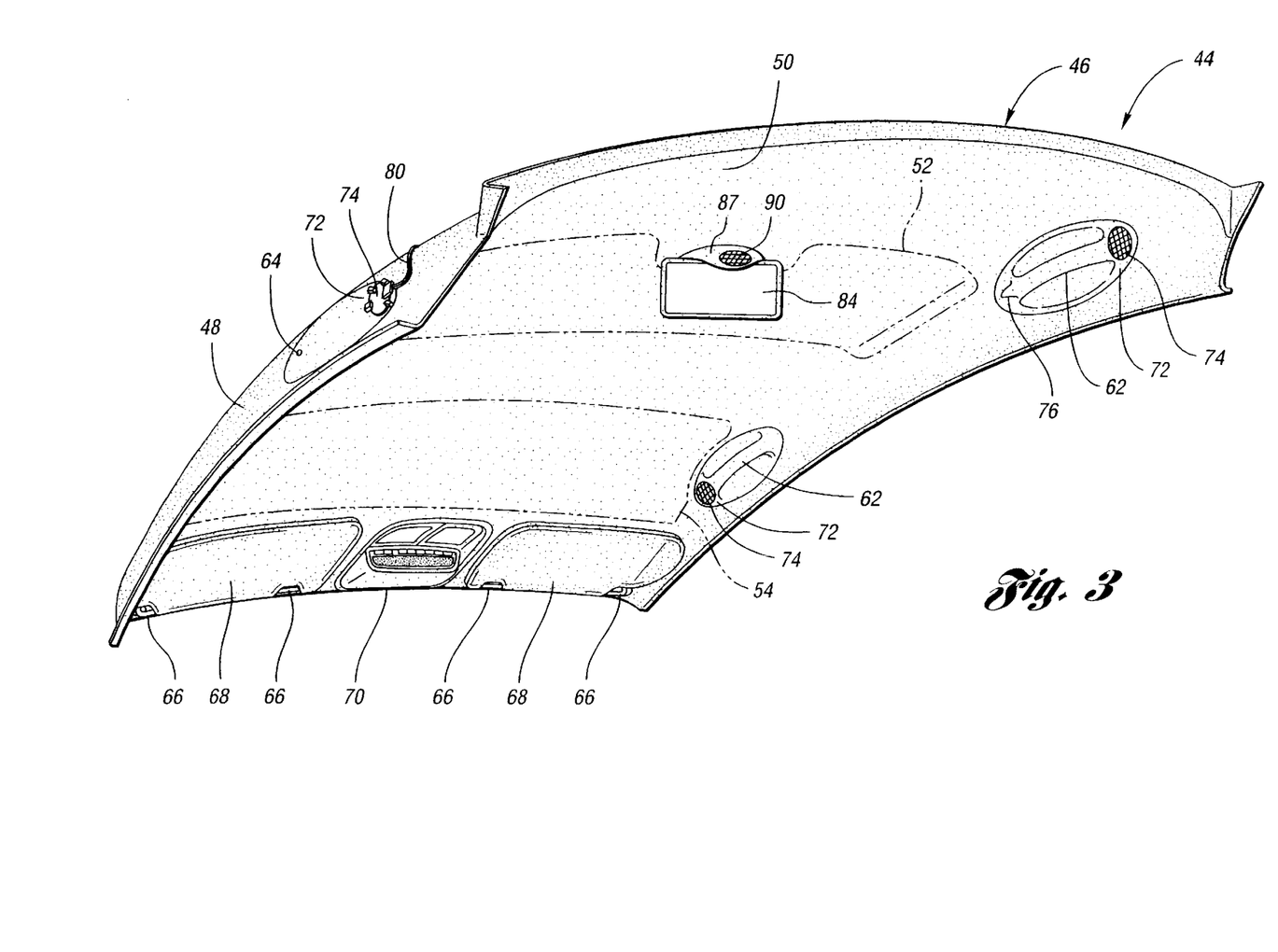
FIG. 3 is a perspective view illustrating a lower surface of a second embodiment of a lightweight, thermoplastic headliner constructed in accordance with the present invention and illustrating a plurality of attachment mechanisms.

Referring now to FIG. 3, there is illustrated a second embodiment of a lightweight, thermoplastic headliner, generally indicated at 44, constructed in accordance with the present invention. Again, the headliner 44 includes a stiff, self-supporting, thermoplastic sheet 46 adapted to be mounted adjacent the roof of an automotive vehicle to underlie the roof and shield the roof from view. The sheet 46 has an upper surface 48 and a lower surface 50.

The headliner 44 is similar to the headliner 20 of FIG. 1 and, in addition, includes a number of attachment mechanisms integrally formed with the thermoplastic sheet 46 such as hollow plastic assist or grab handles 62. The hollow, plastic grab handles 62 are typically formed through a gas-assist injection molding process, as described in greater detail hereinbelow, and as evidenced by a hole 64 formed in the upper surface 48 of the thermoplastic sheet 46.

Figure 7:
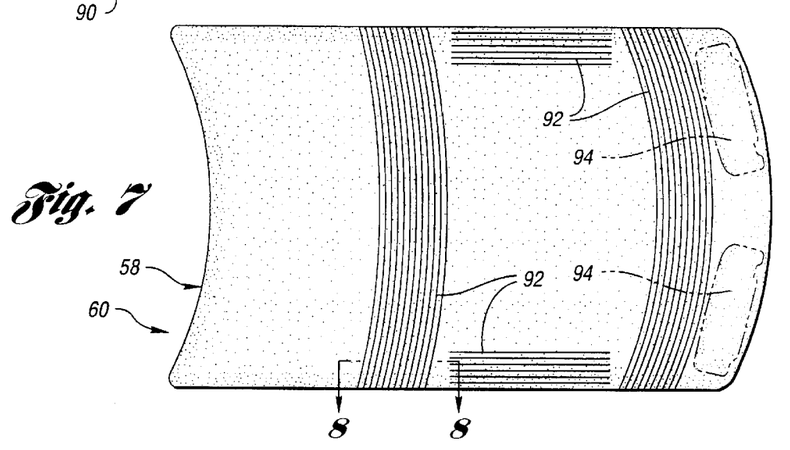
FIG. 7 is a top plan view of a third embodiment of a lightweight, thermoplastic headliner constructed in accordance with the present invention.
Figure 8:
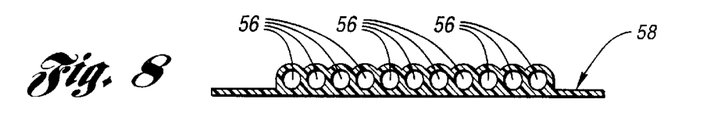
FIG. 8 is a view, partially broken away and in cross-section, taken along the lines 8—8 of FIG. 7 and illustrating another head impact mechanism in the form of a plurality of tubular voids formed in the thermoplastic sheet of the headliner.

The headliner 44 also includes a pair of energy-absorbing, head-impact mechanisms, phantomly-illustrated at 52 and 54, for the front and rear passengers of the automotive vehicle to absorb energy of an impact with the headliner 44 by such passengers. For example, the head-impact mechanism 52 and 54 may be gas-injected, head-impact zones which are flush with the lower surface 50 of the thermoplastic sheet 46, generally of the type illustrated in FIGS. 7 and 8, wherein a series of tubular voids 56 are formed in a thermoplastic sheet 58 of a headliner 60. The tubular voids 56 typically compress while absorbing energy of an impact.

Alternatively, the head-impact mechanisms 52 and 54 may comprise foam-backed material 37, as illustrated in FIGS. 2a and 2b, or may include ribs such as the ribs 30 shown on the upper surface 26 of the thermoplastic sheet 24 of the headliner 20 illustrated in FIG. 1.

Other attachment mechanisms integrally formed with the thermoplastic sheet 46 include molded-in attachments 66 for primary sun visors 68 and a molded-in center console housing 70 for housing switches, front map lights and a digital read-out display. The housing 70 allows these components to be serviced from inside of the occupant compartment. Typically, such switches, read-out display, and front map lights are bench-assembled within the housing 70 prior to assembly and mounting of the headliner 44 to the vehicle roof 22.

The attachment mechanisms may also include frames 72 for vehicle lamps or lights 74 which are integrally formed with the grab handles 62. Also integrally formed with the grab handles 62 are coat hooks 76 for providing an attachment location for a coat hanger, as indicated in phantom at 78 in FIG. 5.

Figure 9:
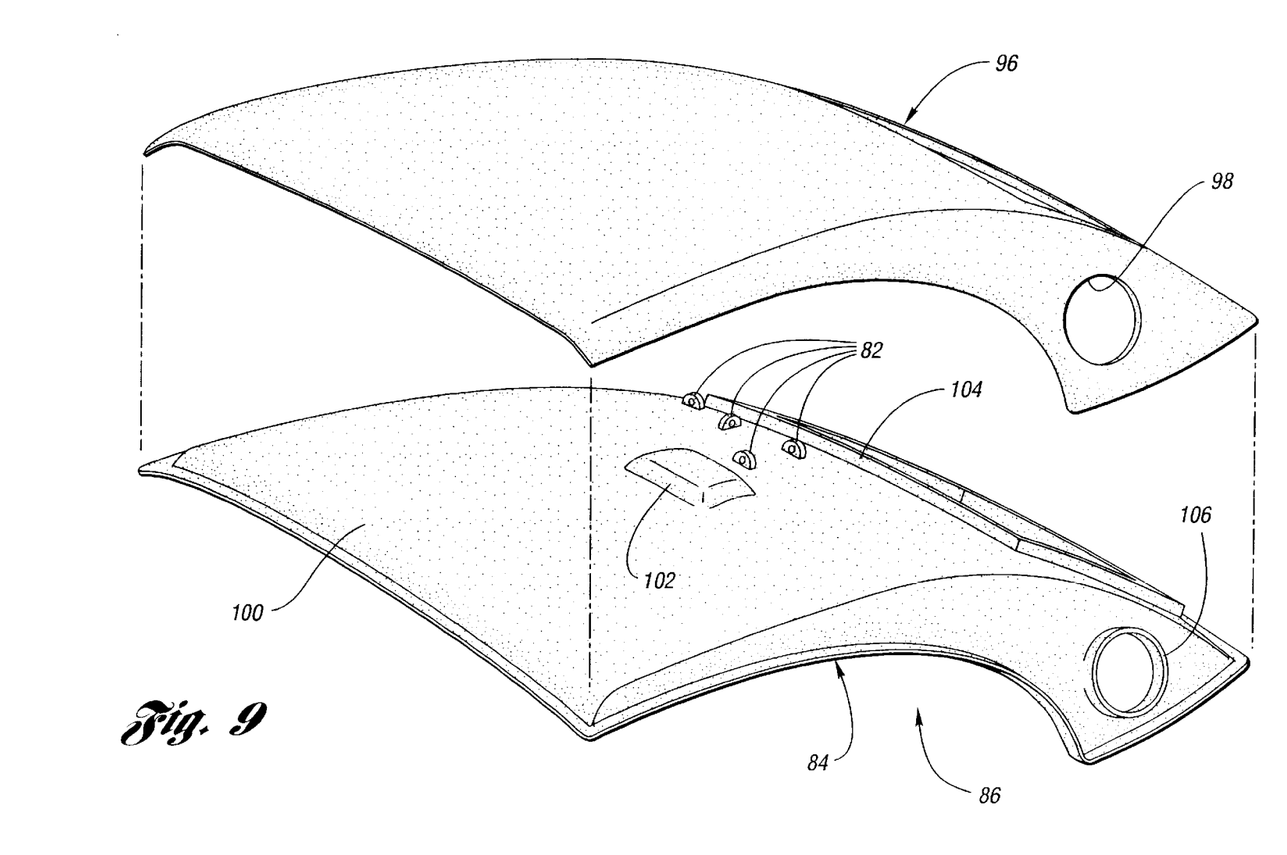
FIG. 9 is a view similar to FIG. 1 illustrating yet a fourth embodiment of a lightweight, thermoplastic headliner constructed in accordance with the present invention and adjacent an SMC plastic roof.

As further illustrated on the upper surface 48 of the sheet 46 in FIG. 3, wires or wiring 80 for providing electrical power to the lamps 74 may be bench assembled to the thermoplastic sheet 46 and secured in position on the upper surface 48 of the thermoplastic sheet 46 by integrally-formed, apertured structures in the form of mounds 82 as illustrated in FIG. 9 with respect to yet another embodiment of a stiff, self-supporting, thermoplastic sheet, generally indicated at 84, of a vehicle headliner 86. The mounds 82 are slotted at an upper surface thereof so that the wiring 80 can be pushed therethrough and received and retained within apertures formed therethrough to secure and direct the wiring 80 at the upper surface 48 of the thermoplastic sheet 46.

As further illustrated in FIG. 3, yet another attachment mechanism integrally formed with the thermoplastic sheet 46 provides an attachment housing 87 for a rear seat mirror 88 and a rear seat light 90. The attachment housing 87 is formed in the center of the thermoplastic sheet 46 on the lower surface 50. Typically, the housing 87 allows the mirror 88 and the light 90 to rotate or swivel 90° and allows the mirror 88 to fold up or down.

Figures 4, 5, 6:
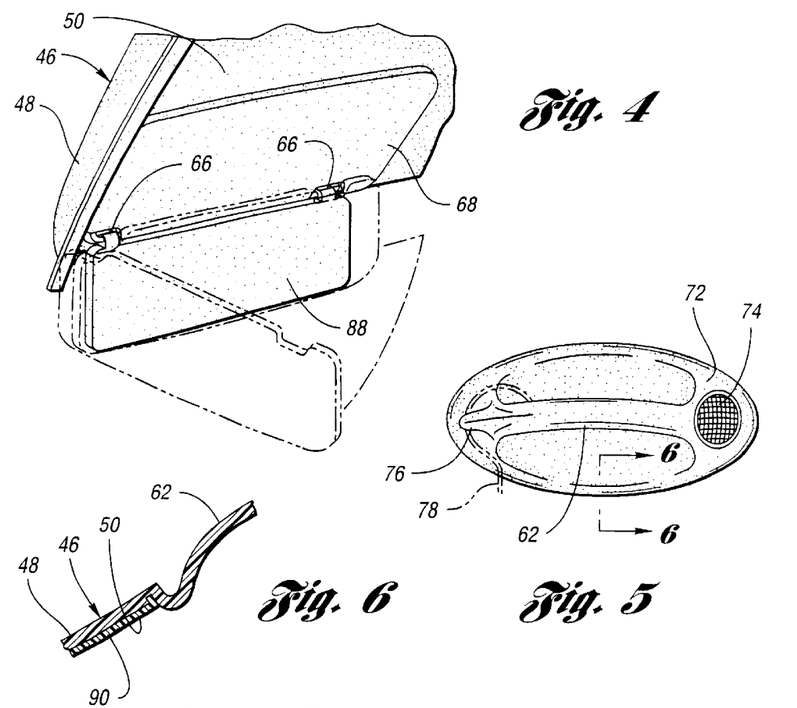
FIG. 4 is a perspective view, partially broken away, of a portion of the headliner of FIG. 3 wherein primary and secondary sun visors are illustrated attached to the thermoplastic sheet by attachment mechanisms, the secondary sun visor being illustrated by phantom lines.
FIG. 5 is a front elevational view of a hollow assist handle together with a hanger hook and a lamp frame all of which are integrally molded with the lightweight, thermoplastic headliner of FIG. 3 and also illustrating a portion of a hanger by phantom lines.
FIG. 6 is a view, partially broken away and in cross-section, taken along lines 6—6 of FIG. 5 of the interface between the lower surface of the thermoplastic sheet and the assist handle.

Referring now specifically to FIG. 4, the primary visor 68 not only can be rotated upward to its solid line position shown in FIG. 4, but also can be folded down and to the side as illustrated by phantom lines in FIG. 4. A secondary visor 88 takes the place of the primary visor 68 when the primary visor is swung upward or to the side. Typically, the attachments 66 for the visors 68 and 68 are integrally molded with the thermoplastic sheet 46. The primary and secondary sun visors 68 and 88, respectively, are bench-assembled to the thermoplastic sheet 46 prior to installation of the headliner 44 to the vehicle roof 22.

Referring specifically now to FIG. 6, which is a view partially broken away and in cross-section of a portion of the combined plastic grab handle 62 and the frame 72 for the light 74, there is illustrated flocking material 90 secured to the thermoplastic sheet 46 and bonded thereto such as by an adhesive or by insert molding of the flocking material 90 with the sheet 46.

Referring again to FIGS. 7 and 8, the lightweight, thermoplastic headliner 60, as previously mentioned, includes a plurality of energy-absorbing, head-impact mechanisms 92 formed on the thermoplastic sheet 58 for absorbing energy of an impact with the headliner 60 by a passenger of the vehicle. Each of the energy-absorbing head impact mechanisms 92 includes a series of tubular voids 56 formed in the thermoplastic sheet 58 and which are compressible for absorbing energy of the impact. As in the embodiment of FIG. 3, the thermoplastic sheet 58 provides a number of attachment mechanisms (not shown) for assembling sun visors 94 thereto at a lower surface of the thermoplastic sheet 58.

Referring again to FIG. 9, there is illustrated a removable plastic vehicle roof, generally indicated at 96, having an opera window 98 formed therein. The vehicle roof 96 may be made from sheet molding compounds (SMC) while the self-supporting, thermoplastic sheet 84 may be made of polypropylene, TPO or ABS as in the prior embodiments.

The headliner 86 also includes one or more of the previously described energy-absorbing, head-impact mechanisms. Such mechanisms are not disclosed in FIG. 9 for purposes of simplicity. For example, the energy-absorbing, head-impact mechanisms may include energy-absorbing ribs formed on an upper surface 100 of the thermoplastic sheet 84 for absorbing energy of an impact with the headliner 86 by a passenger of the vehicle.

The headliner 86 also includes multiple attachment mechanisms such as a dome 102 integrally formed with the thermoplastic sheet 84 to provide an attachment location for a light (not shown) to which wires (not shown) are electrically connected for providing electrical power to the light. The apertured mounds 82 provide attachment locations for the wires or wire harness used to provide electrical power to the light housed by the dome 102.

Still referring to FIG. 9, the headliner 86 also includes a raised, hollow frame portion by which the headliner 86 is at least partially secured to the vehicle roof 96. For example, the raised frame portion 104 may secure the headliner 86 to the vehicle roof 86 by glue or tape. Also, the raised frame portion 104 helps to define the rear window section of the vehicle.

Also, the lightweight, thermoplastic headliner 86 includes a pair of circular window frame portions 106 also integrally formed with the thermoplastic sheet 84 on opposite sides thereof and which extend through corresponding opera windows or openings 98 (only one of which is shown) formed in the vehicle roof 96 after assembling the headliner 86 to the vehicle roof 96. The headliner 86, while stiff and self-supporting, is somewhat flexible to bend inwardly during assembling the headliner 86 to the vehicle roof 96 to allow snap-fitting of the headliner 86 to the vehicle roof 96 via the frame portions 106.

Figure 10:
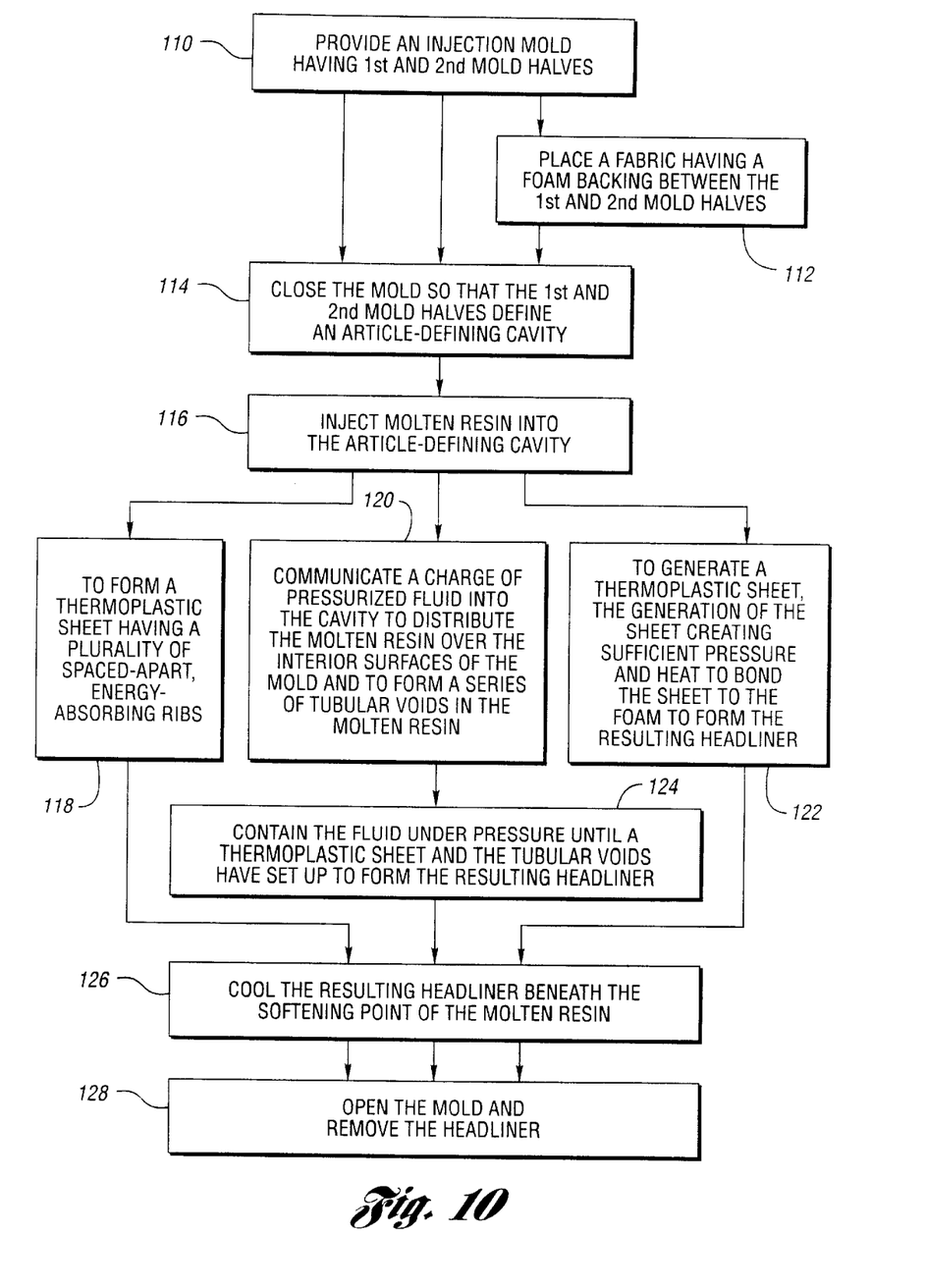
FIG. 10 is a block diagram flow chart illustrating the various injection molding steps for constructing the various lightweight, thermoplastic headliners of FIGS. 1–9.

Referring now to FIG. 10, there is illustrated in block diagram, flow chart form three different injection molding methods for making the lightweight, thermoplastic vehicle headliners previously described, each of which has at least one integrally-formed, energy-absorbing, head-impact mechanism formed therewith. Those steps which are common to all three injection molding methods have associated therewith three arrows to indicate that that particular block is common to each of the injection molding methods. Those blocks which have only a single arrow entering and leaving the block is unique to the particular single injection molding method.

At block 110, which is common to each of the three injection molding methods, an injection mold having first and second mold halves is provided.

At block 112, which is only applicable to the third injection molding method, a fabric or other material having a foam backing is placed between the first and second mold halves.

At block 114, which is also common to all three injection molding methods, the mold is closed so that the first and second mold halves define an article-defining cavity.

At block 116, which is also common to each of the molding methods, molten resin is injected into the article-defining cavity.

At block 118, which is unique to and only applicable to the first molding method, the molten resin, which was previously injected into the article-defining cavity as illustrated by block 116, forms a thermoplastic sheet having a plurality of spaced apart energy-absorbing ribs.

At block 120, which is unique only to the second injection molding method, a charge of pressurized fluid is communicated into the article-defining cavity to distribute the molten resin over the interior surfaces of the mold and to form a series of tubular voids in the molten resin. This step can be commonly found in a conventional, gas-assist, injection molding method.

At block 122, the molten resin, which is previously injected into the article-defining cavity at block 116, is utilized to generate a thermoplastic sheet. The generation of the thermoplastic sheet creates sufficient pressure and heat to bond the sheet to the foam backing, which was previously placed between the first and second mold halves at block 112, to form the resulting headliner.

At block 124, which is unique to and is applicable only to the second injection molding method, the charge of pressurized fluid is contained under pressure until the thermoplastic sheet and the tubular voids have set up to form the resulting headliner.

At block 126, which is common to all three of the injection molding methods, the resulting headliner is cooled beneath the softening point of the molten resin utilized in forming the thermoplastic sheet.

At block 128, the mold is opened and the headliner is removed from the mold.

If desired, the headliner may then either by partially or completely vacuum- or thermo-formed to achieve the final desired shape of the headliner.

Each of the embodiments of the lightweight, thermoplastic vehicle headliner constructed in accordance with the present invention meet a number of headliner requirements and provide a number of headliner benefits as outlined below.

Headliner Requirements and Benefits

Cost
  Meets targets and provides more value for the money
Weight
  Weighs less than today's conventional headliners
  If weight is greater, it is explainable by the number of additional attachment mechanisms
NVH (Noise, Vibration, Harshness)
  Part passes NVH testing
Assembly/Service
  Attachments (molded-in)
  Ease of removal and replacement
  Ability to reduce current warranty
    Pinched wires
    Pinched drain tube
Head Impact
  <800 HIC(d) as tested
Dimensional Stability
  Overall tolerances of <±2.0 mil.
Features
  Grab handles
  Safety—FMVSS 201
  Wiring
  Dimensional stability
  NVH—sound absorption
  Side curtain air bag can be stored therein
  Sunshade conveniences
    Retractable
    Side window
    Rear passenger
    Backlight close out
  Structural integrity
  Attachments
  Cloth with foam backing can be attached
  Overhead console
  Sunroof and drain tubes can be accommodated
  Storage
  Garage door opener
  Rear vanity mirrors
  HVAC with controls for passenger
  Lighting and fiber optics
  Audio speakers
  Auxiliary radio
  Overhead microphone for phone
  Overhead message center
  Roll out sunscreen for backlight
  Cargo net
  Overhead LED TV
  Occupant sensors
  Structural member of the vehicle While the best mode for carrying out the invention has been described in detail, those familiar with the art to which this invention relates will recognize various alternative designs and embodiments for practicing the invention as defined by the following claims.

What is claimed is:

1. A lightweight, thermoplastic headliner for use in a vehicle having a roof, the headliner comprising:
   a stiff, self-supporting, thermoplastic sheet adapted to be mounted adjacent the roof so as to underlie the roof and completely shield the roof from view, the sheet having an upper surface and a lower surface; and
   a plurality of spaced energy-absorbing, head-impact mechanisms formed on the sheet for absorbing energy of an impact with the headliner by a passenger of the vehicle
   wherein each of the head-impact mechanisms include a plurality of spaced-apart, energy-absorbing, thermoplastic structures which are integrally molded to and extend upwardly from the upper surface of the thermoplastic sheet and wherein the number, spacing, and size of the structures are predetermined based on head-impact requirements.

2. The headliner as claimed in claim 1 wherein the thermoplastic structures are integrally molded ribs which are permanently deformable by the roof for absorbing energy of the impact.

3. The headliner of claim 2 wherein the headliner comprises two sets of ribs located on the passenger and driver sides of the headliner and oriented traverse to the longitudinal axis of the vehicle.

4. The headliner as claimed in claim 1 wherein the at least one head-impact mechanism includes a material having a foam backing bonded to the lower surface of the thermoplastic sheet to create a cosmetically-acceptable appearance for the headliner and which is compressed by a passenger of the vehicle to absorb energy of the impact.

5. The headliner of claim 4 wherein the material is fabric.

6. The headliner as claimed in claim 1 further comprising at least one attachment mechanism integrally formed with the thermoplastic sheet.

7. The headliner as claimed in claim 6 wherein the at least one attachment mechanism is a plastic grab handle.

8. The headliner as claimed in claim 7 wherein the grab handle is hollow.

9. The headliner as claimed in claim 6 wherein the at least one attachment mechanism provides an attachment location for securing a sun visor to the headliner.

10. The headliner as claimed in claim 6 wherein the at least one attachment mechanism provides an attachment location for securing a mirror to the headliner.

11. The headliner as claimed in claim 6 wherein the at least one attachment mechanism provides an attachment location for securing an overhead counsel to the headliner.

12. The headliner as claimed in claim 6 wherein the at least one attachment mechanism provides an attachment location for removably securing a coat hanger to the headliner.

13. The headliner as claimed in claim 6 wherein the at least one attachment mechanism provides an attachment location for securing a lamp to the headliner.

14. The headliner as claimed in claim 6 wherein the at least one attachment mechanism includes a plurality of spaced, apertured structures for receiving and retaining electrical wires therein.

15. The headliner as claimed in claim 6 wherein the at least one attachment mechanism includes a pair of apertured window frames adapted to be received and retained within corresponding openings in the roof of the vehicle.

16. The headliner as claimed in claim 1 wherein the thermoplastic of the sheet is thermoplastic polyolefin (TPO) or polypropylene or ABS.

17. A lightweight, thermoplastic headliner for use in a vehicle having a roof, the headliner comprising:
   a stiff, self-supporting, thermoplastic sheet adapted to be mounted adjacent the roof so as to underlie the roof and completely shield the roof from view, the sheet having an upper surface and a lower surface; and
   at least one energy-absorbing, head-impact mechanism formed on the sheet for absorbing energy of an impact with the headliner by a passenger of the vehicle wherein the at least one head-impact mechanism includes a series of tubular voids integrally formed in the thermoplastic sheet and which are compressible for absorbing energy of the impact and wherein the number, spacing and size of the voids are predetermined based on head-impact requirements.

* * * * *